US009832394B2

(12) United States Patent
Slaby et al.

(10) Patent No.: US 9,832,394 B2
(45) Date of Patent: Nov. 28, 2017

(54) ADAPTIVE LOW-LIGHT VIEW MODES

(71) Applicant: Google Technology Holdings LLC, Mountain View, CA (US)

(72) Inventors: Jiri Slaby, Buffalo Grove, IL (US); William S. Pierce, Algonquin, IL (US); Lawrence A. Willis, McHenry, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 230 days.

(21) Appl. No.: 14/283,269

(22) Filed: May 21, 2014

(65) Prior Publication Data

US 2015/0281593 A1    Oct. 1, 2015

Related U.S. Application Data

(60) Provisional application No. 61/972,533, filed on Mar. 31, 2014.

(51) Int. Cl.
*H04N 5/33* (2006.01)
*H04N 5/265* (2006.01)
(Continued)

(52) U.S. Cl.
CPC ......... *H04N 5/265* (2013.01); *G06F 17/3028* (2013.01); *G06F 17/30247* (2013.01);
(Continued)

(58) Field of Classification Search
CPC ........ H04N 5/265; H04N 5/332; H04N 5/232; H04N 5/23293; H04N 5/2351;
(Continued)

(56) References Cited

U.S. PATENT DOCUMENTS 6,597,807 B1    7/2003  Watkins et al.
6,791,472 B1    9/2004  Hoffberg
(Continued)

FOREIGN PATENT DOCUMENTS

EP    1879148 A2    1/2008
EP    2487913 A2    8/2012
(Continued)

OTHER PUBLICATIONS

Jiang Yu Zheng et al., "Pervasive Scene Map on Wireless Devices for City Navigation", 2009 International Conference on Network-Based Information Systems, Aug. 19, 2009, 8 pages.
(Continued)

*Primary Examiner* — Jared Walker
(74) *Attorney, Agent, or Firm* — Shumaker & Sieffert, P.A.

(57) ABSTRACT

This document describes techniques and apparatuses for implementing adaptive low-light view modes. These techniques and apparatuse enable a computing device to capture infrared (IR) imagery at a particular location and retrieve, based on the particular location, previously-captured imagery that corresponds with the IR imagery. The IR imagery and previously-captured imagery can then be combined to provide composite imagery, which is presented to a user. By so doing, the user's view of the particular location can be enhanced, particularly in low-light conditions.

15 Claims, 7 Drawing Sheets

(51) Int. Cl.
| | |
|---|---|
| *G06F 17/30* | (2006.01) |
| *G06K 9/00* | (2006.01) |
| *H04N 5/232* | (2006.01) |
| *G06T 5/50* | (2006.01) |
| *H04N 5/235* | (2006.01) |

(52) U.S. Cl.
CPC ............ *G06K 9/00288* (2013.01); *G06T 5/50* (2013.01); *H04N 5/232* (2013.01); *H04N 5/23245* (2013.01); *H04N 5/23293* (2013.01); *H04N 5/332* (2013.01); *G06T 2207/10024* (2013.01); *G06T 2207/10048* (2013.01); *G06T 2207/20221* (2013.01); *H04N 5/2351* (2013.01)

(58) Field of Classification Search
CPC ........ H04N 5/23216; H04N 5/33; G06T 5/50; G06T 2207/10048; G06T 2207/10024; G06T 2207/30196; G06K 9/00288; G06F 17/3028
USPC .......................................................... 348/164
See application file for complete search history.

(56) References Cited

U.S. PATENT DOCUMENTS

| | | | | |
|---|---|---|---|---|
| 6,792,136 | B1* | 9/2004 | Niesen | .................. G06T 11/001 250/330 |
| 7,571,051 | B1 | 8/2009 | Shulman | |
| 7,796,081 | B2 | 9/2010 | Breed | |
| 8,339,508 | B2 | 12/2012 | Levy | |
| 2006/0266942 | A1 | 11/2006 | Ikeda | |
| 2008/0024608 | A1 | 1/2008 | Hahn et al. | |
| 2010/0225766 | A1 | 9/2010 | Haigh | |
| 2010/0280751 | A1 | 11/2010 | Breed | |
| 2011/0117532 | A1* | 5/2011 | Relyea | ...................... G01J 3/02 434/307 R |
| 2012/0242697 | A1* | 9/2012 | Border | ............... G02B 27/0093 345/633 |
| 2013/0004016 | A1 | 1/2013 | Karakotsios | |
| 2013/0050395 | A1* | 2/2013 | Paoletti | .................. H04N 7/142 348/14.02 |
| 2013/0300850 | A1* | 11/2013 | Millikan | .............. A61B 5/0077 348/77 |

FOREIGN PATENT DOCUMENTS

| | | |
|---|---|---|
| EP | 1847112 B1 | 6/2013 |
| EP | 2608528 A1 | 6/2013 |
| JP | 2011066809 A | 3/2011 |
| KR | 20120038755 A | 4/2012 |

OTHER PUBLICATIONS

International Search Report and Written Opinion corresponding to PCT/US2015/022852 mailed Jun. 10, 2015, 14 pages.
Infrared Cameras Now Small Enough to Be in Your Phone, Popular Mechanics, http://www.popularmechanics.com/technology/gadgets/news/infrared-cameras-now-small-enough-to-be-in-your-phone-15827860, downloaded from the internet: May 19, 2014, all pages.
Image and Visual Represenatation Group IVRG, Combining near-infrared and visible images, EPFL Ecole Polytechnique Federal De Lausanne, http://ivrg.epfl.ch/research/infrared/enhanement, downloaded from internet May 19, 2014, all pages.
Yanli Wang; Zhe Chen, "Scene matching navigation based on multisensor image fusion", SPIE Digital Library, From Conference vol. 5286, Third International Symposium on Multispectral Image Processing and Pattern Recognition, 788 (Sep. 29, 2003); doi:10.1117/12.538650, all pages.
Junju Zhang et al.: "Region-Based Fusion for Infrared and LLL Images".
Kogut, G. et al.: Sensor Fusion for Intelligent Behavior on Small Unmanned Ground Vehicles, Proceedings of the SPIE—vol. 6561, Unmanned Systems Technology IX, p65611V (May 2, 2007), all pages.
Schlachtman, "Using Monocular Vision and Image Correlation to Accomplish Autonomous Localization," Retrieved from http://digitalcommons.calpoly.edu/cgi/viewcontent.cgi?article=1336&context=theses, Jun. 2010, 55 pp.
Zhang et al., "Region-Based Fusion for Infrared and LLL Images," Image Fusion, InTech, 2011, pp. 285-302.
International Preliminary Report on Patentability from International Application No. PCT/US2015/022852, mailed Oct. 13, 2016, 10 pp.
Advisory Action from U.S. Appl. No. 14/283,276, dated Dec. 12, 2016, 4 pp.
Singh et al., "Integrated Multilevel Image Fusion and Match Score Fushion of Visible and Infrared Face Images for Robust Face Recognition," Lane Department of Computer Science and Electrical Engineering, West Virginia University, USA, Jun. 26, 2007, 14 pp.

* cited by examiner

ADAPTIVE LOW-LIGHT VIEW MODES

BACKGROUND

This background description is provided for the purpose of generally presenting the context of the disclosure. Unless otherwise indicated herein, material described in this section is neither expressly nor impliedly admitted to be prior art to the present disclosure or the appended claims.

The human eye often has difficulty perceiving imagery or scenery in low-light conditions, such as at night. This inability to see at night also worsens as a person ages because the anatomy of the human eye deteriorates over time. Examples of this deterioration may include clouding of a lens, shrinking of a pupil, and loss of photoreceptors or sensitivity thereof. As such, and particularly for adults, the inability to see in low-light conditions can be inconvenient or frustrating, and in some cases, such as driving, a safety concern.

Further, existing technology, which may be leveraged to augment human night vision, also suffers from day and night performance disparities. For example, image sensors of computing devices are often designed to function in daylight, which results in poor imaging capabilities in low-light conditions. Thus, attempting to use an image sensor of a computing device at night often provides no benefit to a user and may further contribute to the user's frustration.

BRIEF DESCRIPTION OF THE DRAWINGS

Techniques and apparatuses enabling adaptive low-light view modes are described with reference to the following drawings. The same numbers are used throughout the drawings to refer to like features and components.

DETAILED DESCRIPTION

The human eye is typically unable to perceive imagery or scenery in low-light conditions, whether at night or in unlit indoor spaces. At the very least, this can be inconvenient for a person attempting to navigate or explore in low-light conditions, and, in some cases, may even be unsafe. Even conventional computing devices, which are capable of providing navigation services, are often of little use in low-light conditions due to their inherent design for daylight operation.

This disclosure describes techniques and apparatuses that facilitate adaptive low-light view modes, which enable a computing device to capture infrared (IR) imagery at a particular location and retrieve, based on the particular location, previously-captured visible-light imagery (e.g., daylight or daytime imagery) that corresponds with the IR imagery. The IR imagery and previously-captured imagery can then be combined to provide composite imagery, which is presented to a user. By so doing, the user's view of the particular location can be enhanced, particularly in low-light conditions. For example, when the previously-captured imagery includes color imagery captured in daytime, the composite imagery presented to the user may include elements of this color imagery. This can be effective to allow the user to perceive, at night, at least some of the imagery of the location in visible-light conditions.

The following discussion first describes an operating environment, followed by techniques that may be employed in this environment, and ends with example apparatuses.

Operating Environment

Figure 1:
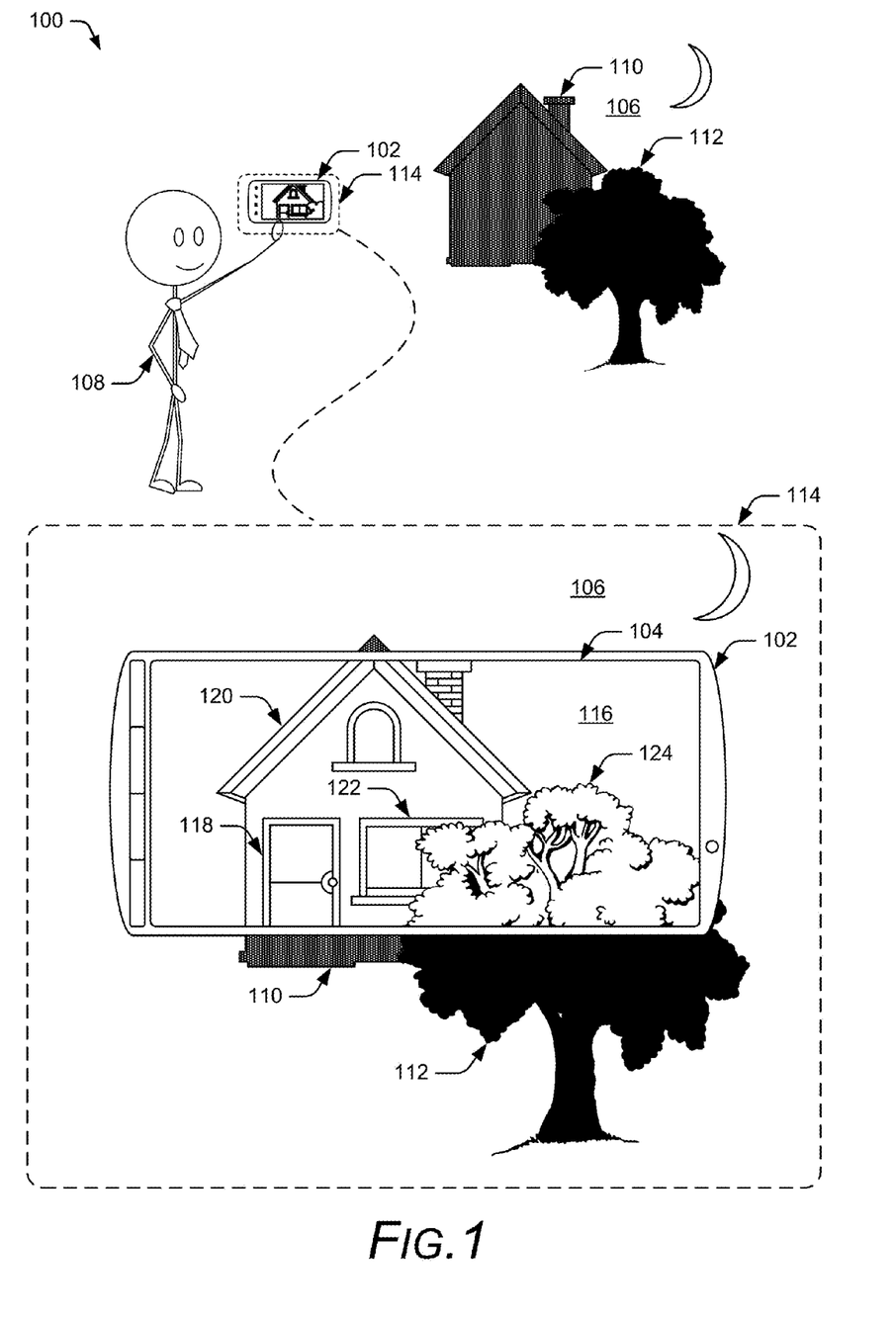
FIG. 1 illustrates an example environment in which techniques of adaptive low-light view modes can be implemented.

FIG. 1 illustrates an example environment 100 in which techniques of adaptive low-light view modes can be implemented. Environment 100 includes a computing device 102 having a display 104 through which imagery of location 106 is presented to a user. Imagery of location 106 is captured by a camera (not shown) of computing device 102 or another device (not shown) associated with computing device 102. In some embodiments, the camera of computing device 102 or the other device is capable of sensing light that is not perceivable by the human eye, such as infrared (IR) or low-lux light. For example, assuming user 108 is at location 106 at night, the camera of computing device 102 can capture IR imagery of location 106.

Display 104 may present a user interface for configuring the camera of computing device 102 or selecting view modes through which imagery of location 106 is presented by display 104 (e.g., a viewfinder interface). The view modes of computing device 102 may include a normal visible-light view mode, an IR view mode, and one or more adaptive low-light view modes, which are described below. Which imagery of location 106 presented by display 104 depends on how user 108 orientates computing device 102 with respect to location 106 or environment 100. An example of one such orientation is shown in FIG. 1, in which user 108 is shown standing in front of house 110 and tree 112 of location 106. In this particular example, because user 108 is at location 106 at night, house 110 and tree 112 appear to user 108 when not viewed through display 104, as dark objects overcast by moonlight.

When user 108 orients computing device 102 (and the camera thereof) toward house 110 and tree 112, user 108 can see a portion of house 110 and a portion of tree 112 through display 104. For visual clarity, a view of location 106 from a perspective of user 108 is shown at detailed view 114. As shown by detailed view 114, some imagery of location 106 can be viewed through display 104, while other imagery of location 106 is visible around the periphery of computing device 102. In this particular example, imagery shown through display 104 is shown as composite imagery 116, which is provided by a low-light view mode of computing device 102. Here, features of house 110 and tree 112 that were previously not visible due to darkness, such as door 118, roof 120, window 122, and leaves 124, are visible in composite imagery 116.

Generally, a low-light view mode can be implemented by leveraging capabilities of the camera and other components of computing device 102 to provide composite imagery. In some aspects, the camera captures IR imagery and a global positioning system (GPS) of computing device 102 determines a location at which the IR imagery is captured.

Computing device 102 retrieves, based on the location, previously-captured imagery, such as imagery captured at daytime or in visible-light conditions. The previously-captured imagery can then be combined with the IR imagery to provide composite imagery. In some cases, objects of the previously-captured imagery are oriented and superimposed over the IR imagery effective to present a visible-light view of the location. Here, note that the term visible-light in the general context of this disclosure is not intended to be limiting and may include, or be used interchangeably with, light of any suitable type or source, such daylight, sunlight, artificial light, and the like.

In the context of the present example, this is shown in FIG. 1 as features of house 110 and tree 112 being visible in composite imagery 116, while other features of the location 106, such as a trunk of tree 112, are not visible without the aid of computing device 102. This is but one example of implementing an adaptive low-light view mode to provide composite imagery. How computing device 102 is implemented to provide this and other embodiments of adaptive low-light view modes may vary and is described below.

Figure 2:
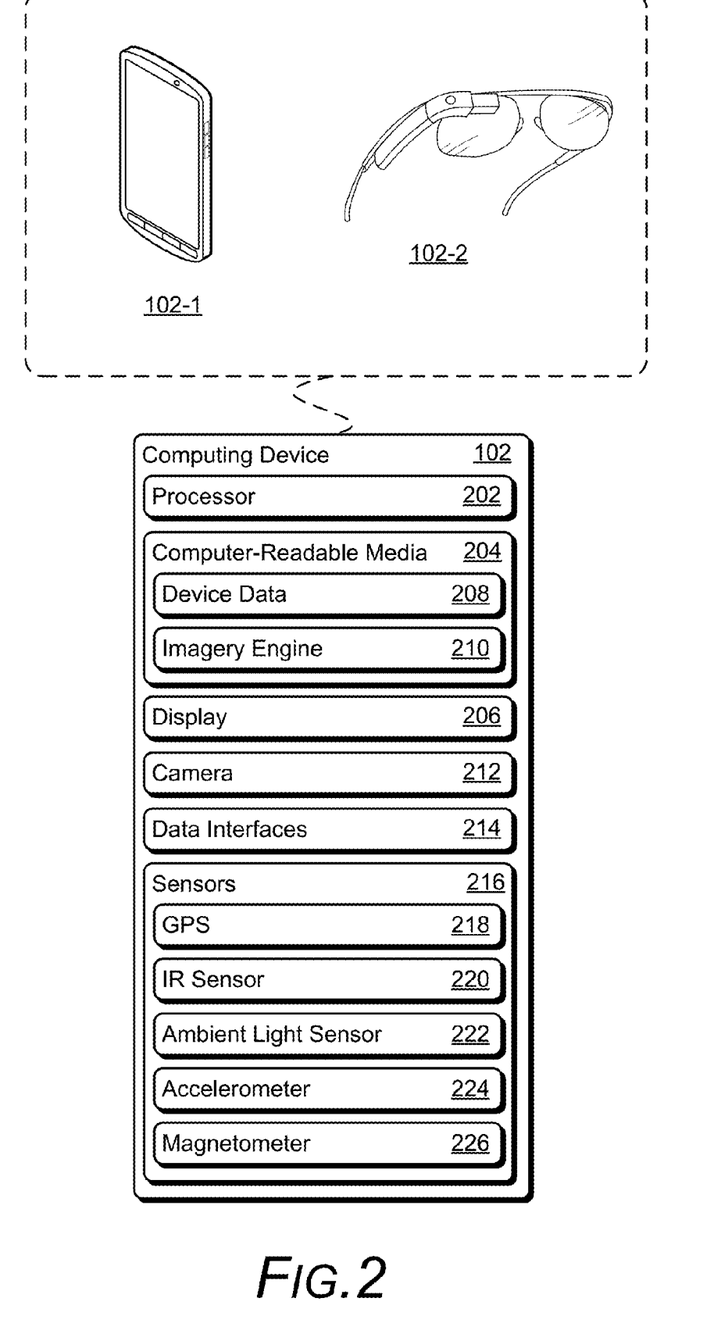
FIG. 2 illustrates example computing devices capable of implementing adaptive low-light view modes.

More specifically, consider FIG. 2, which illustrates an example embodiment of computing device 102 of FIG. 1. Computing device 102 can be, or include, many different types of computing or electronic devices capable of implementing adaptive low-light view modes. In this example, computing devices 102 are shown as smart phone 102-1 and smart glasses 102-2, though other devices are contemplated. Other computing devices 102 may include, by way of example only, a cellular phone, notebook computer (e.g., netbook or ultrabook), camera (compact or single-lens reflex), smart-watch, tablet computer, personal media player, personal navigation device (e.g., global positioning system), vehicle navigation system, heads-up-display (HUD), gaming console, desktop computer, video camera, or portable gaming device. In some cases, embodiments of adaptive low-light view modes are implemented by two or more devices, such as a computing device and accessory devices (e.g., standalone camera and/or display devices) that are operably coupled with the computing device. Alternately or additionally, the computing device may be integrated with, or operably coupled with, one or more components of a smart vehicle, such as a windshield or window that may serve as a display to present views of an environment as virtual daylight reality.

Computing device 102 includes processor 202, which may be configured as a single or multi-core processor capable of enabling various functionalities of computing device 102. In some cases, processor 202 includes a video processing core for processing various images or video of computing device 102. Processor 202 may be coupled with, and may implement functionalities of, any other components or modules of computing device 102 that are described herein.

Computing device 102 includes computer-readable media 204 (CRM 204) and display 206. Computer-readable media 204 includes device data 208, such as an operating system, firmware, or applications of computing device 102 that are executable by processor 202. Alternately or additionally, device data 208 may include various user data, such as images, music, documents, emails, contacts, and the like. CRM 204 also include imagery engine 210, which in this example are embodied as computer-executable code stored on CRM 204.

Imagery engine 210 can combine, merge, or otherwise integrate multiple sources of imagery or video. For example, imagery engine 210 can combine IR imagery with previously-captured imagery to provide composite imagery in accordance with one or more aspects of adaptive low-light view modes. Alternately or additionally, imagery engine may also manage visual aspects or effects applied to composite imagery presented by display 206. For example, imagery engine 210 may alter (e.g., control or manipulate) an aspect ratio, pan, rotation, optical-depth, zoom, crop, stretch, or shrink applied to imagery presented by display 206. Further implementations and uses of imagery engine 210 vary and are described below in greater detail.

Display 206 presents imagery or content for viewing by a user. Display 206 may be implemented as, or similar to, display 104 as described with reference to FIG. 1. Alternately, display 206 may be implemented as a screen or lens of a remote device, such as a vehicle windshield, or as a lens or projection lens of smart glasses 102-2. In some cases, the user can interact with content-related applications or graphical user-interfaces of computing device 102 through display 206. In such cases, the display may be associated with, or include, a touch-sensitive input device (e.g., touch-screen) through which user input is received. Display 206 can be configured as any suitable type of display, such as an organic light-emitting diode (OLED) display, active matrix OLED display, liquid crystal display (LCD), in-plane shifting LCD, transparent LCD cell, projection display, projector lens, and so on.

Computing device 102 may also include camera 212, which is configured to sense or capture imagery or scenery surrounding computing device 102. In this example, camera 212 is implemented on a surface of computing device 102 that is opposite a surface on which display 206 is implemented. In other cases, camera 212 is implemented on the same surface as display 206 or as part of an accessory device associated with computing device 102. In at least some embodiments, display 206 presents real-time imagery captured by forward-facing camera 212, such as when configured as a viewfinder of computing device 102. Thus, as a user orients or re-orients computing device 102 within an environment, imagery presented by display 206 changes as camera 212 captures different imagery of the environment.

In some embodiments, camera 212 may be sensitive to spectral ranges of light that are different from light that is visible to the typical human eye. These different spectral ranges of camera 212 may include infrared light, ultraviolet light, low-lux light, or increased sensitivity to light within a particular range of visible light. In some cases, light captured in a different spectral range is leveraged to provide a low-light view mode in which the light of the different spectral range is visually represented via display 206 (e.g., thermal or night vision).

Computing device 102 includes data interfaces 214 for communicating data via a network or other connection. In some cases, these data interfaces 214 are wireless transceivers for communicating via a wireless network (not shown) or directly with other devices. Examples of these wireless networks include a cellular network, wireless wide-area network (WWAN), wireless local-area network (WLAN), and wireless personal-area network (WPAN), each of which may be configured, in part or entirely, as infrastructure, ad-hoc, or mesh networks. For example, an interface configured as a short-range wireless transceiver may communicate over a WPAN in accordance with a Bluetooth™ protocol.

In some embodiments, data interfaces 214 enable multiple devices to implement adaptive low-light view modes. For example, smart phone 102-1 and smart glasses 102-2 may each implement different, although possibly redundant, components or functions for implementing an adaptive low-light view mode. In the context of this example, imagery engine 210 may reside on smart phone 102-1, while smart glasses 102-2 implement display 206 and camera 212. In such cases, data (e.g., imagery or video data) can be communicated between smart phone 102-1 and smart glasses 102-2 via respective data interfaces 214 of each device.

Alternately or additionally, data interfaces 214 include wired data interfaces for communicating with other devices, such as local area network (LAN) Ethernet transceiver, serial data interface, audio/video port (e.g., high-definition multimedia interface (HDMI) port), or universal serial bus (USB) port. These wired data interfaces may be implemented using standard connectors or through the use of proprietary connectors and associated cables providing enhanced security or interconnect density.

Computing device 102 may also include sensors 216, which enable computing device 102 to sense various properties, variances, or characteristics of an environment in which computing device 102 operates. In this particular example, sensors 216 include a global positioning system (GPS) 218, infrared (IR) sensor 220, ambient light sensor 222, accelerometer 224, and magnetometer 226. GPS 218 is capable of determining a geographic location and other navigational information (e.g., velocity or heading) of computing device 102 via signals received from navigation satellites. When the navigational satellites are unavailable, GPS 218 may provide an approximate location of computing device 102 by performing dead-reckoning calculations, which rely on other sensors, such as inertial sensors and accelerometers. Location of computing device 102 may also be determined using cellular tower triangulation and WiFi® detection as commonly known in the art.

IR sensor 220 is configured to provide infrared (IR) imagery of scenery toward which computing device 102 is oriented. IR sensor 220 may capture IR imagery in any suitable format, such as video, streams, or a series of images. IR sensor 220 may be implemented separately from, or integrated with, camera 212. Alternately or additionally, IR sensor 220 may be implemented as a micro-bolometer sensor based IR camera configured for thermal imaging (e.g., a thermal camera or thermal sensor), a standard camera with an IR filter open to IR light wavelengths, or any other suitable IR or low-light related imaging sensor. Ambient light sensor 222 enables computing device 102 to determine a level of ambient light present in an environment or location in which computing device 102 is situated. For example, information received from ambient light sensor 222 can be compared with a threshold to determine if computing device 102 is in daylight, darkness, moonlight, indoors, and so on.

Accelerometer 224 enables an orientation or motion of computing device 102 to be determined. Alternately or additionally, accelerometer 224 can enable motion control or input, image stabilization when capturing imagery, or enhance navigational accuracy (e.g., dead-reckoning). Accelerometer 224 may be configured as any suitable type of sensor, such as, piezoelectric, piezoresistive, capacitive, or micro electro-mechanical system (MEMS). Magnetometer 226 is configured to sense magnetic field strength or changes in magnetic fields. Magnetometer 226 may also enable an orientation of computing device 102 to be determined. For example, magnetometer 226 can be used to determine an orientation of computing device 102 based on magnetic field strength or magnetic field direction.

Sensors 216 may also include other types of sensors, such as a proximity sensor, acoustic sensor, magnetic sensor, temperature/thermal sensor, micro-electromechanical systems, camera-type sensor (e.g., charge-coupled device sensor or complementary-metal-oxide semiconductor sensor), capacitive sensor, and so on. Alternately or additionally, sensors 216 enable interaction with, or receive input from, a user of computing device 102. In such a case, sensors 216 may include piezoelectric sensors, acoustic wave sensors, thermal touch sensors, capacitive touch sensors, input sensing-logic associated with hardware switches (e.g., keyboards, snap-domes, or dial-pads), and so on. In at least some embodiments, sensors 216 (e.g., accelerometer 224 or magnetometer 226) enable an orientation or direction of camera 212 or IR sensor 220 to be determined.

Example Techniques

The following discussion describes techniques enabling adaptive low-light view modes. These techniques can be implemented utilizing the previously described entities, such as display 206, imagery engine 210, camera 212, GPS 218, or IR sensor 220 of FIG. 2. These techniques include example methods illustrated in FIGS. 3, 5, and 6, which are shown as operations performed by one or more entities. The orders in which operations of these methods are shown or described are not intended to be construed as a limitation, and any number or combination of the described method operations can be combined in any order to implement a method, or an alternate method, including any of those illustrated by FIGS. 3, 5, and 6.

Figure 3:
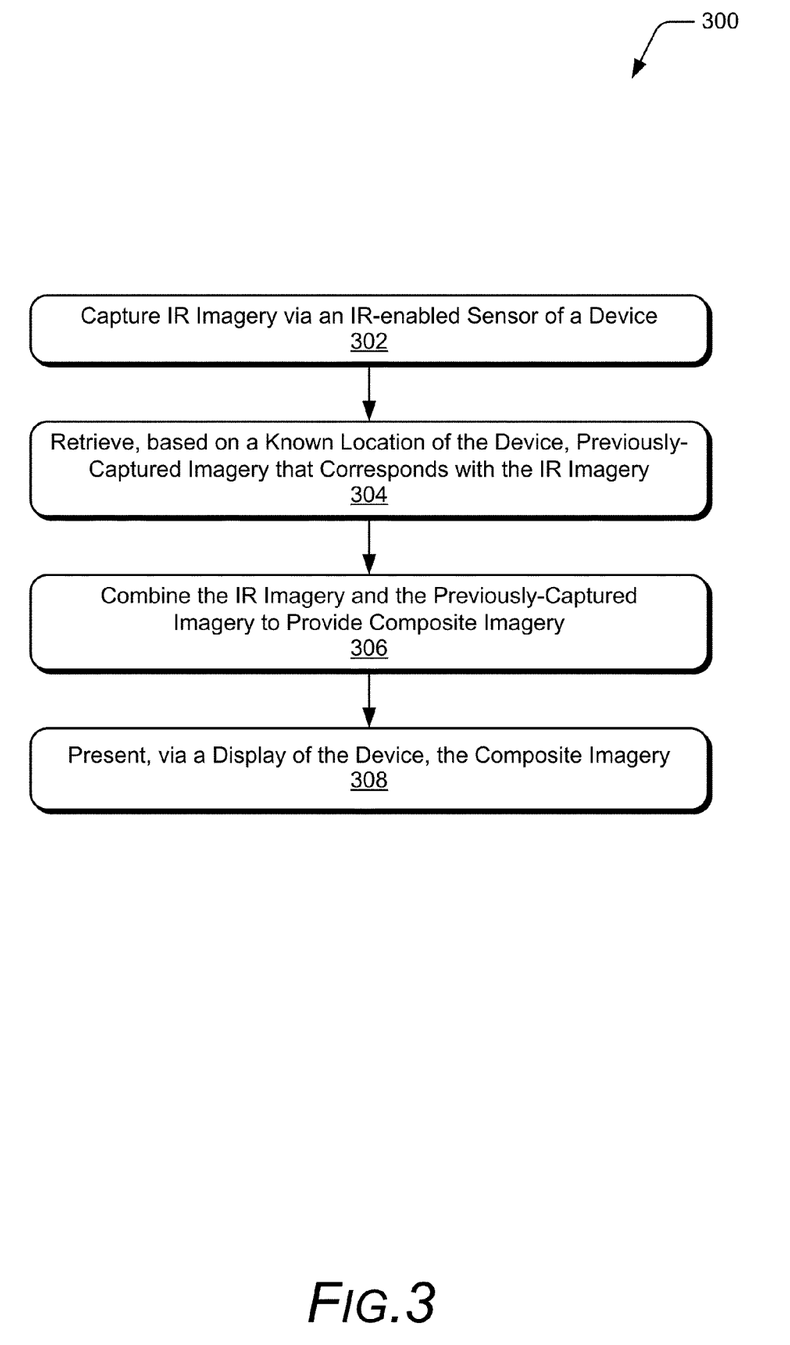
FIG. 3 illustrates an example method of combining infrared imagery and previously-captured imagery.

FIG. 3 illustrates example method 300 of combining infrared imagery and previously-captured imagery.

At 302, infrared (IR) imagery is captured via an infrared-enabled (IR-enabled) sensor of a device. The IR-enabled sensor of the device may be a dedicated IR sensor of the device or a camera of the device that is IR sensitive. Generally, the IR-enabled sensor captures IR imagery of a particular location. In some cases, the IR imagery is a stream of imagery or series of images captured in real time. In such cases, the IR imagery includes objects or elements of a location that are presently at the location. Alternately or additionally, when the IR imagery is captured in low-light conditions, the IR imagery may lack color or other visual qualities that are perceivable in visible-light conditions.

Figure 4:
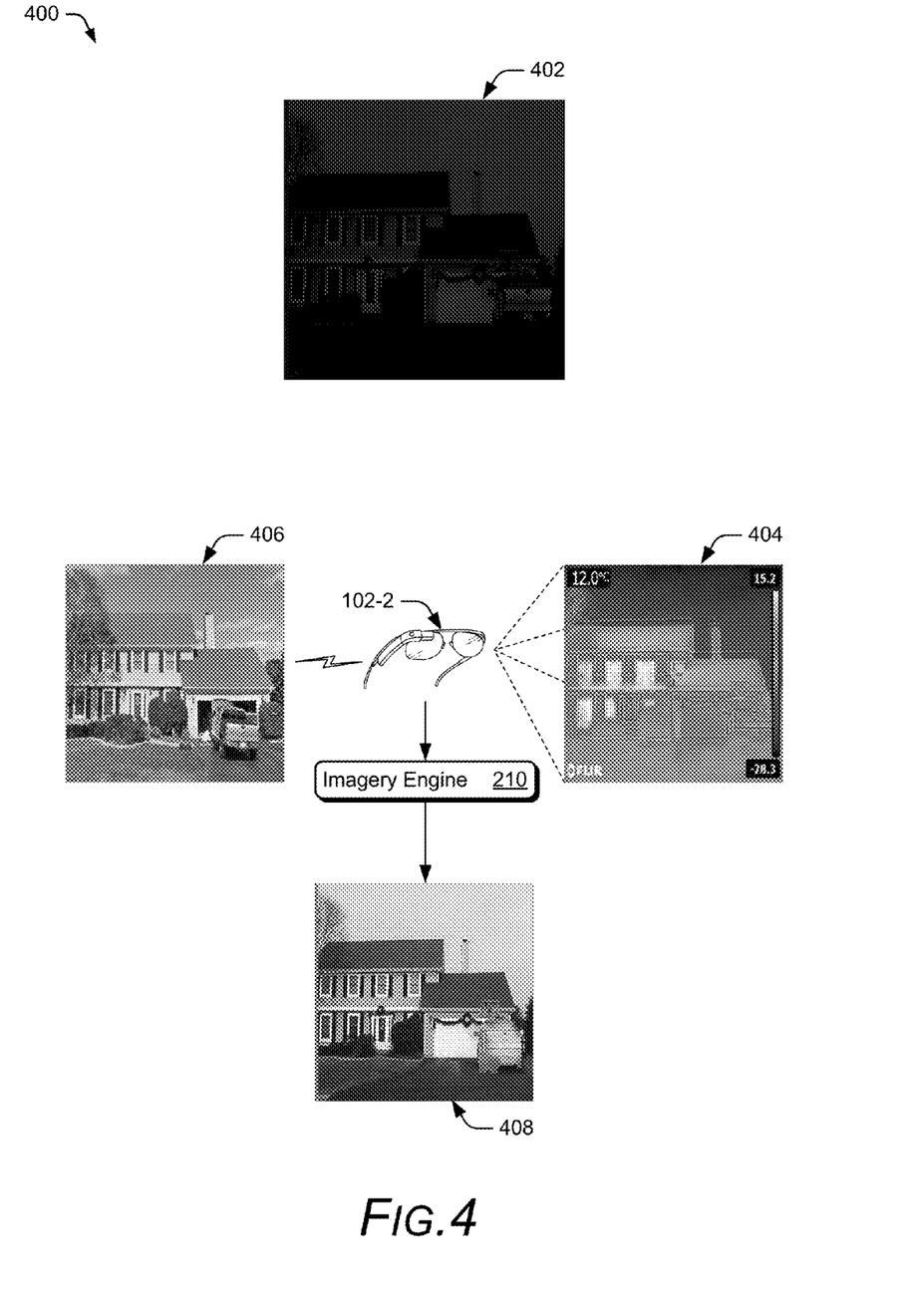
FIG. 4 illustrates an example of composite imagery provided in accordance with one or more embodiments.

By way of example, consider example environment 400 of FIG. 4, in which a user of smart glasses 102-2 is attempting to navigate to a friend's house at night. Assume here that the user has navigated to the neighborhood in which his friend lives, but, in the low-light conditions of night, is unable determine which house belongs to his friend. As the user looks around the neighborhood, smart glasses 102-2 are oriented toward various houses, one of which is shown from the perspective of the user as night imagery 402. Assume here that imagery engine 210 detects the low-light conditions and activates a low-light view mode of smart glasses 102-2. While smart glasses 102-2 are oriented toward the house, IR sensor 220 captures IR imagery 404 of the house. Here, note that IR imagery 404 exposes more details of the house in the form of thermal signatures or variances.

At 304, previously-captured imagery is retrieved from an online repository. The previously-captured imagery can be visible-light imagery captured under daylight or artificial light, and stored to the repository for later use, such as street-view navigation. The previously-captured imagery is retrieved based on the location of the device. In some cases, the location of the device is determined by GPS, an association with known wireless networks, or using a previously known location, map data, and inertial/movement data of the device (e.g., dead reckoning). Alternately or additionally, an orientation of the device is determined using sensors of the device (e.g., accelerometer, magnetometer, gyroscope, etc.) or based on differences between the IR imagery and the previously-captured imagery. The orientation or direction of the device may be useful in retrieving additional or more-accurate previously-captured imagery.

In the context of the present example, a geographic location and direction of smart glasses 102-2 are determined using GPS 218. Additionally, an orientation of smart glasses 102-2 is determined using an accelerometer, magnetometer, or gyroscope (not shown) of sensors 216. Imagery engine 210 then transmits, via data interfaces 214, the geographic location, direction, and orientation of smart glasses 102-2 to a remote server (e.g., cloud service) storing street-view imagery captured previously-captured during daylight hours. Imagery engine 210 then receives, based on the transmitted information, previously-captured imagery 406 from the remote server. Although shown in grayscale, previously-captured imagery 406 shows detailed aspects of the house in visible-light conditions (e.g., color or daylight conditions).

At 306, the IR imagery and the previously-captured imagery are combined to provide composite imagery. This may include colorizing some details of the IR imagery based on information included in the previously-captured imagery. In some cases, elements in the IR imagery and the previously-captured imagery are detected or parsed. In such cases, each element of the respective imagery may be prioritized based on various factors, such as mobility, permanence, or immovability. Alternately or additionally, elements of either set of imagery may be moved, added, or deleted based on an elements position in the other set of imagery. For example, an element in the previously-captured imagery may be added or moved within the composite imagery based on the element's location in the IR imagery.

Continuing the ongoing example, imagery engine 210 integrates elements of IR imagery 404 and previously-captured imagery 406 to provide composite imagery 408. By so doing, imagery engine 210 can provide a visible-light view of a location in low-light conditions. In this particular example, imagery engine 210 colorizes details of the house in IR imagery 404 using details of a house in previously-captured imagery 406. Alternately or additionally, imagery engine 210 may superimpose, and align, various elements of previously-captured imagery 406 over respective elements of IR imagery 404. Note here that a truck in front of the house is currently in the right-hand side of the driveway. To reflect the actual position of the truck, imagery engine 210 shows an IR or artificially colored representation of the truck in the correct location (right-hand side of the driveway), and deletes (e.g., omits or removes) the truck that is part of the previously-captured imagery 406.

At 308, the composite imagery is presented via a display of the device. In some cases, the composite imagery is presented to a user in real-time, such as through a live feed or stream of composite imagery. In such cases, the composite imagery can be progressively presented as IR imagery and previously-captured imagery are integrated to provide the composite imagery. Alternately or additionally, the composite imagery can be updated as a direction or orientation of the device changes with respect to the location. By so doing, a visible-light view of a low-light location can be provided to a user exploring or navigating the location.

Concluding the present example, imagery engine 210 presents composite imagery 408 via display 206 of smart glasses 102-2. As shown in composite imagery 408, the user observes features of the house in visible-light conditions, which enables the user to conveniently explore the neighborhood at night. Assume here that the user has previously visited his friend in daytime and recognizes the house, truck, and basketball hoop shown in composite imagery 408. Based on this visible-light view of the location provided by composite imagery 408, the user can verify that he is at his friend's house.

Figure 5:
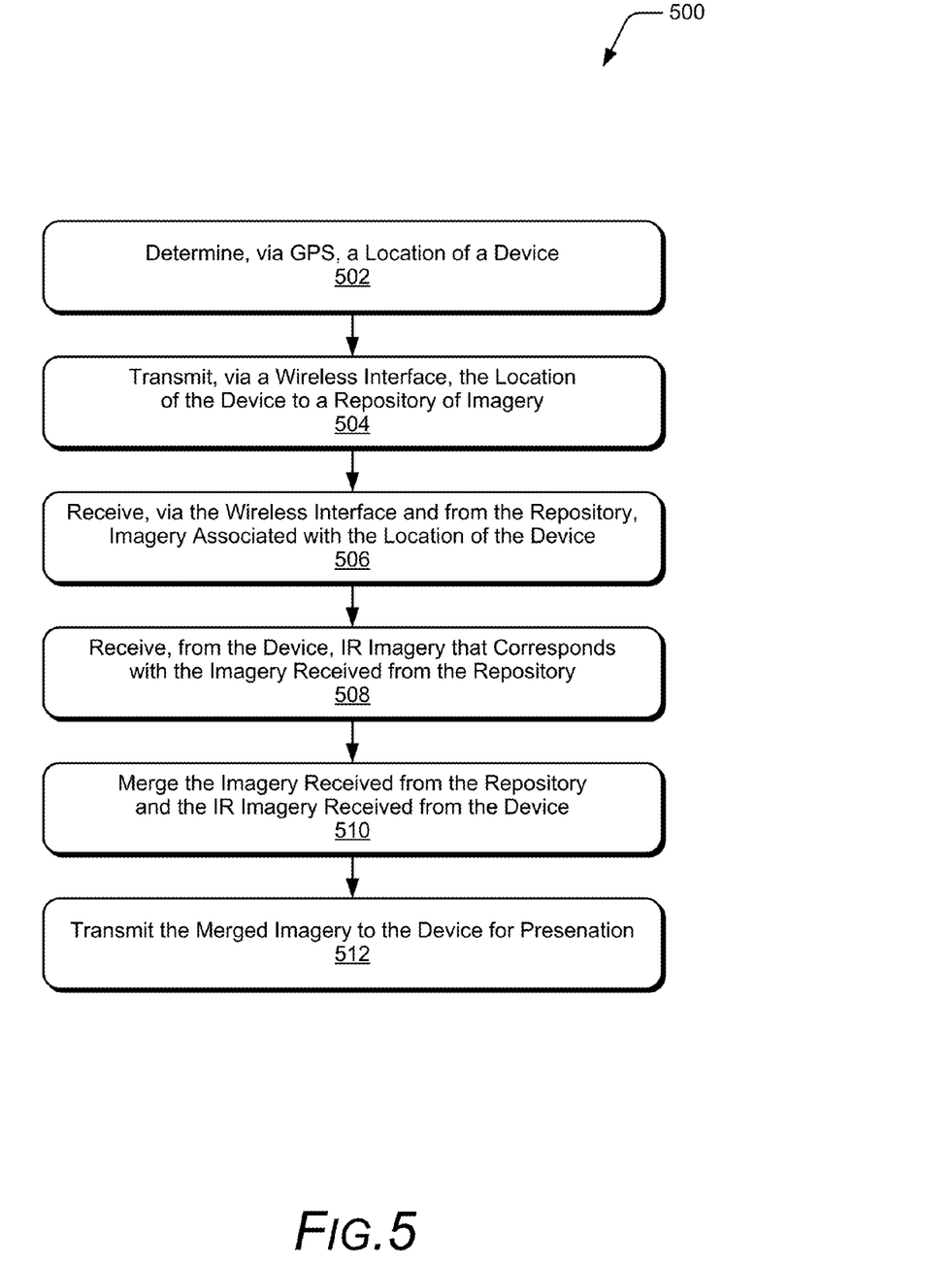
FIG. 5 illustrates an example method of merging infrared imagery received from a device and previously-captured imagery.

FIG. 5 illustrates methods 500 of merging infrared imagery received from a device and previously-captured imagery.

At 502, a location of a device is determined via GPS. The GPS may be integrated with the device (e.g., smart glasses) or another device (e.g., smart phone) associated with the device via a wireless communication link. When the location of the device is determined by the GPS of another device, the location of the device may be an approximate location of the device. In such cases, the approximate location can be estimated based on the location of the other device and a range of the wireless link. Alternately or additionally, a direction or an orientation of the device is determined using other sensors of the device, such as an accelerometer, magnetometer, and the like.

At 504, the location of the device is transmitted to a repository of imagery via a wireless interface. The wireless interface may be embodied on either the device (e.g., smart glasses) or the other device (e.g., smart phone) associated with the device. Transmitting the location of the device may include transmitting any suitable information, such as GPS coordinates, associations with wireless networks, sensor data, and the like. In some cases, information describing an orientation of the device is also transmitted to the repository of imagery. The repository of imagery stores imagery that was previously-captured and may include imagery previously-captured at a current location of the device. In some cases, the previously-captured imagery includes imagery surrounding locations, such as panoramic views that provide imagery of a 360 degree view of a given location.

At 506, imagery associated with the location of the device is received via a wireless interface of the device. This imagery includes imagery previously-captured at the location, such as imagery captured in visible-light conditions, under artificial light, or different seasons of the year. For cases in which the previously-captured imagery is available for different seasons of the year, the imagery can be prioritized to match a current season or other seasonal information as indicated by a calendar or other historical information (e.g., Farmer's Almanac™). The imagery may be received in any suitable format, such as a series of images, panoramic image of the location, stream of imagery, video feed, and so on. In at least some embodiments, the imagery received from the repository may include indicators, such as geo-tags, that are associated with elements of the imagery.

At 508, infrared imagery is received from the device. This IR imagery corresponds with the imagery received from the repository. The IR imagery may be captured by an IR sensor or IR-sensitive camera of the device. In some cases, the IR imagery is received as a series of images, stream of video, or real-time feed of captured IR imagery. Generally the IR imagery represents a user's current view of a location and may be captured with a handheld or wearable device, such as smart glasses. Thus, the IR imagery may be used to determine a direction or orientation of the device by deriving differences between the IR imagery and the previously-captured imagery, which may correspond, in whole or part, with the user's view of the location. Further, in some embodiments, the IR imagery may include elements relevant to safety, such as humans or animals in a road way or dark area. In such cases, thermal images of these elements may also be received from the device for further display or prioritizing functions.

At 510, the imagery received from the repository and the IR imagery are merged to provide merged imagery. The operations to merge the imagery may be performed at the device, by another local device (e.g., smart phone), or by a remote service provider (e.g., cloud server) to which the IR imagery is transmitted. The merged imagery provides an enhanced view of the location, which may include or add color to the IR imagery. For example, color information can be added to monochromatic IR imagery based on the color information of the imagery received from the repository. By so doing, a visible-light view of the location can be provided to a user exploring the location in low-light conditions.

Alternately or additionally, elements of the imagery received from the repository and objects of the IR imagery can be prioritized, respectively. Once prioritized, elements of each set of imagery can be merged based on their respective priorities. Elements of each imagery can be prioritized based on similar or different parameters, such as the mobility of an object, geo-tag information associated with an object, presence of the object in the real-time IR imagery, or lack of the object in the real-time IR imagery. For example, one set of priority parameters can be applied to elements of the imagery received from the repository, such as landmarks, physical structures, or permanent objects. Another set of priority parameters can be applied to elements of the IR imagery, such as moving objects, humans, animals, cars, or other non-permanent objects.

At 512, the merged imagery is transmitted to the device for presentation. In some cases, the device includes a transparent display that enables presentation of the merged imagery over a user's view of the location. In such cases, the presentation of the merged imagery enables the user to explore the location by looking through the display or by orienting the display to view different portions of the location. Alternately or additionally, IR imagery elements relevant to safety can also be presented to the user thereby alerting the user of the presence of the elements at the location. For example, while a user is driving a car down a dark road, IR thermal images of animals can be presented on a windshield of the car enabling the user to see the animal in low-light conditions.

Figure 6:
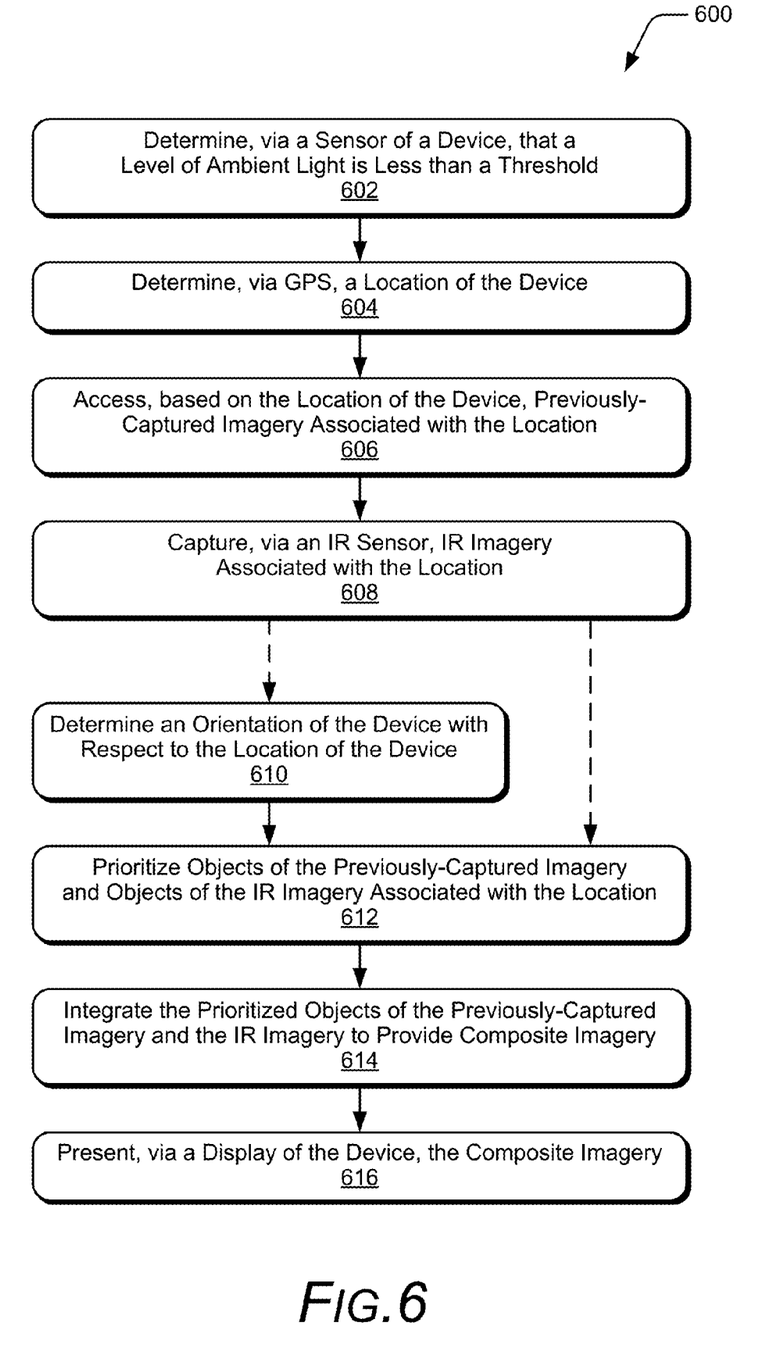
FIG. 6 illustrates an example method of integrating prioritized objects of previously-captured imagery and infrared imagery.

FIG. 6 illustrates example method 600 of integrating prioritized objects of previously-captured imagery and infrared imagery.

At 602, it is determined that a level of ambient light is less than a threshold. The level of ambient light is detected using an ambient light sensor of a device. In some cases, the threshold is configured to activate an adaptive low-light view mode when the level of ambient light indicates darkness or other low-light conditions. In such cases, the threshold may also be configured to disable traditional or visible-light view modes of the device, which would not be useful in darkness. By way of example, consider method 600 in the context of FIG. 1, in which user 108 is standing in front of house 110 and tree 112. Here, ambient light sensor 222 determines a level of ambient light and imagery engine 210 determines that the level of ambient light indicates a nighttime environment. Responsive to this determination, imagery engine 210 activates an adaptive low-light view mode of smart phone 102-1.

At 604, a location of the device is determined using GPS. In some cases, a heading or direction of the device is also determined using the GPS or other sensors of the device. For example, a GPS module of a device may provide a geographical location of a device, a velocity of the device, and a heading indicating which direction the device is facing. Additionally, an accelerometer or magnetometer of the device may provide an orientation or direction of which the device is facing. Continuing the ongoing example, a location of smart phone 102-1 is determined using GPS 218, which indicates that user 108 is standing in the street in front of house 110. Accelerometer 224 also provides orientation and directional information indicating that the user is pointing camera 212 of smart phone 102-1 toward house 110 and tree 112.

At 606, previously-captured imagery associated with the location of the device is accessed. The previously-captured imagery can be imagery captured in visible-light conditions, such as street-view imagery previously cataloged and saved to an online repository. In some cases, the previously-captured imagery is accessed by transmitting the location of the device to an online repository or cloud service that provides previously-captured imagery. In the context of the present example, imagery engine 210 transmits the location of smart phone 102-1 to an online repository of imagery captured in visible-light conditions (e.g., daylight). In response to receiving the location, the online repository transmits imagery associated with the location at which house 110 and tree 112 reside.

At 608, infrared (IR) imagery associated with the location is captured via an IR sensor of the device. In some cases, the IR imagery is captured by a camera that is sensitive to IR or other bands of light. This IR imagery captured at the location is real-time imagery (e.g., live feed), which may be captured as a video, stream, or series of images. Continuing the ongoing example, imagery engine 210 receives IR imagery from camera 212 of smart phone 102-1, which is implemented as an IR sensitive camera.

Optionally at 610, an orientation of the device is determined with respect to the location. In some cases, the orientation is determined by comparing the previously-captured imagery with the IR imagery captured in real-time. Alternately or additionally, directional or orientation sensors of the device can be used to determine the orientation of the device. The orientation of the device may be useful when accessing previously-captured imagery and can be transmitted with the location of the device effective to reduce an amount of the previously-captured imagery accessed or searched. In the context of the present example, imagery engine 210 compares the previously-captured imagery with the IR imagery to determine an orientation of the device with respect to the location. By so doing, imagery engine 210 can align objects of the previously-captured imagery with the IR imagery that is received in real-time.

At 612, objects of the previously-captured imagery and objects of the IR imagery are prioritized, respectively. Objects of each imagery can be prioritized based on similar or different parameters, such as a mobility of an object, geo-tag information associated with an object, or presence of the object in the real-time IR imagery. For example, permanent structures, such as homes, curbs, street lamps, mailboxes, are prioritized higher in the previously-captured image than non-permanent objects such as cars, people, animals, landscaping, toys, and the like. Alternately or additionally, the non-permanent objects can be prioritized higher in the IR imagery as those provide information about objects to avoid, such as cars, people, animals, debris, landscaping, and the like.

Continuing the ongoing example, imagery engine 210 prioritizes features of house 110 and features of tree 112. During this process, static features of house 110 are prioritized higher than non-static features of tress 112. For example, all the features of house 110 may be prioritized higher than leaves 124, which change seasonally. Alternately or additionally, a trunk of tree 112 may be prioritized at a level similar to that of the features of house 110 because a location or appearance of the trunk of tree 112 is not likely to change over time.

At 614, the prioritized objects of the previously-captured imagery and the prioritized objects of the IR imagery are integrated to provide composite imagery. Integration of the respective imagery may include removing lower prioritized objects from the composite imagery and/or adding higher prioritized objects to the composite imagery. In some cases, the objects of the previously-captured imagery are superimposed into the composite imagery to add color or visible-light viewable features to the composite imagery. This can be effective to colorize or enhance the composite imagery such that at least some of the objects of the IR imagery appear in visible-light conditions.

In the context of the present example, imagery engine 210 superimposes imagery of house 110, tree 112, and associated landscaping over IR imagery of location 106. Alternately or additionally, imagery engine 210 may select previously-captured imagery of location 106 based on temporal or seasonal information. For example, if user 108 is attempting to explore location 106 in January, imagery engine 210 may select to use imagery captured during a previous winter such that the composite imagery matches a season in which the location is being explored or viewed. Similarly, imagery engine 210 could also select previously-captured imagery based on a time of day (e.g., morning, noon, evening) at which the location is being explored.

At 616, the composite imagery is presented via a display to a user. The display may be integral with, or separate from, the device that integrates the prioritized objects. For example, the display may be integrated with a lens of a wearable computer, windshield of a car, windscreen of a motorcycle, or face shield of a helmet. Displaying the composite imagery can be effective to provide a visible-light or daylight rendering of the location while the user is in low-light conditions (e.g., at night). Concluding the present example, imagery engine 210 presents the composite imagery of house 110 and tree 112 to user 108 via display 104. With reference to FIG. 1, this is illustrated as the features of house 110 and tree 112 being visible though display 104. Additionally, although shown as a black and white illustration, it should be noted that features of house 110 and tree 112 can be shown in color as previously-captured during daylight hours.

Example Electronic Device

Figure 7:
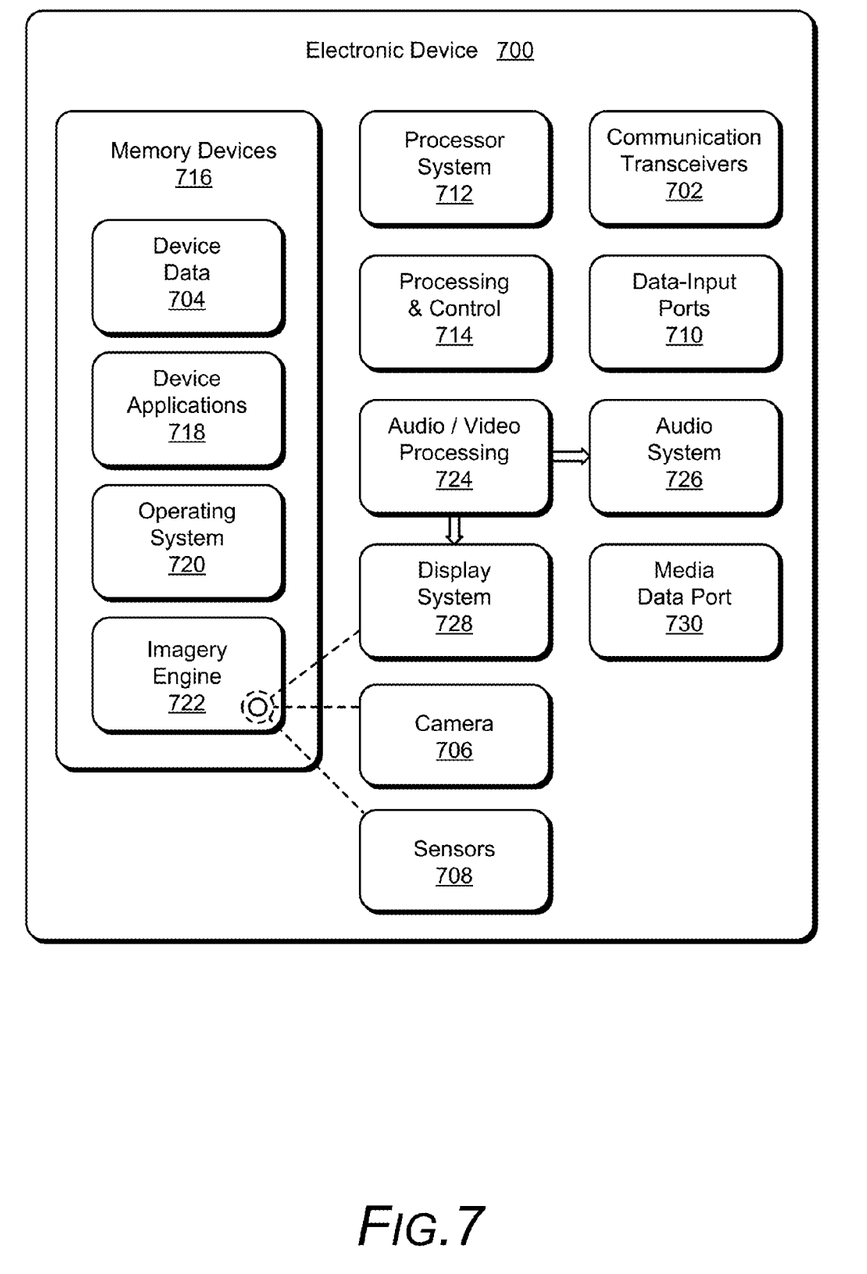
FIG. 7 illustrates various components of an electronic device that can implement techniques of adaptive low-light view modes.

FIG. 7 illustrates various components of an example electronic device 700 that can be implemented as a computing device as described with reference to any of the previous FIGS. 1 through 6. Electronic device 700 can be, or include, many different types of devices capable of implementing adaptive low-light view modes. For example, electronic device 700 may include a camera (compact or single-lens reflex), wearable display, heads-up-display (HUD), phone, personal navigation device, gaming device, Web browsing platform, pager, media player, or any other type of electronic device, such as the computing device 102 described with reference to FIG. 1.

Electronic device 700 includes communication transceivers 702 that enable wired or wireless communication of device data 704, such as received data and transmitted data. Example communication transceivers include WPAN radios compliant with various Institute of Electrical and Electronics Engineers (IEEE) 802.15 (Bluetooth™) standards, WLAN radios compliant with any of the various IEEE 802.11 (WiFi™) standards, WWAN (3GPP-compliant) radios for cellular telephony, wireless metropolitan area network radios compliant with various IEEE 802.16 (WiMAX™) standards, and wired LAN Ethernet transceivers.

In embodiments, electronic device 700 includes camera 706, such as camera 212 as described with reference to FIG. 2. Electronic device 700 may also include sensors 708, such as an infrared sensor, accelerometer, magnetometer, ambient light sensor, location sensor, or GPS as described above. Camera 706 and sensors 708 can be implemented to facilitate various embodiments of adaptive low-light view modes.

Electronic device 700 may also include one or more data-input ports 710 via which any type of data, media content, and inputs can be received, such as user-selectable inputs, messages, music, television content, recorded video content, and any other type of audio, video, or image data received from any content or data source. Data-input ports 710 may include USB ports, coaxial cable ports, and other serial or parallel connectors (including internal connectors) for flash memory, DVDs, CDs, and the like. These data-input ports may be used to couple the electronic device to components, peripherals, or accessories such as keyboards, microphones, or cameras.

Electronic device 700 of this example includes processor system 712 (e.g., any of application processors, microprocessors, digital-signal processors, controllers, and the like) or a processor and memory system (e.g., implemented in a system-on-chip), which process computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively or additionally, the electronic device can be implemented with any one or combination of software, hardware, firmware, or fixed-logic circuitry that is implemented in connection with processing and control circuits, which are generally identified at 714. Although not shown, electronic device 700 can include a system bus, crossbar, interlink, switch fabric, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 700 also includes one or more memory devices 716 that enable data storage, examples of which include random-access memory, non-volatile memory (e.g., read-only memory (ROM), flash memory, EPROM, EEPROM, etc.), and a disk storage device. Memory devices 716 are implemented at least in part as physical devices that store information (e.g., digital or analog values) in storage media, which do not include propagating signals or waveforms. The storage media may be implemented as any suitable type of media such as electronic, magnetic, optic, mechanical, quantum, atomic, and so on. Memory devices 716 provide data-storage mechanisms to store the device data 704, other types of information or data, and various device applications 718 (e.g., software applications). For example, operating system 720 can be maintained as software instructions within memory devices 716 and executed by processors 712. In some aspects, imagery engine 722 is embodied in memory devices 716 of electronic device 700 as executable instructions or code. Although represented as a software implementation, imagery engine 722 may be implemented as any form of a control application, software application, signal processing and control module, firmware that is installed on the device, a hardware implementation of the controller, and so on.

Electronic device 700 also includes audio and video processing system 724 that processes audio data and passes through the audio and video data to audio system 726 and to display system 728. Audio system 726 and display system 728 may include any modules that process, display, or otherwise render audio, video, display, or image data, such as imagery engine 722. Display data and audio signals can be communicated to an audio component and to a display component via a radio-frequency link, S-video link, HDMI, composite video link, component video link, digital video interface, analog audio connection, or other similar communication link, such as media data port 730. In some implementations, audio system 726 and display system 728 are external components to electronic device 700. Alternatively or additionally, display system 728 can be an integrated component of the example electronic device, such as part of an integrated display, wearable display, or touch interface. As described above, imagery engine 722 may manage or control display system 728, or components thereof, in aspects of adaptive low-light view modes.

Although embodiments of adaptive low-light view modes have been described in language specific to features and/or methods, the subject of the appended claims is not necessarily limited to the specific features or methods described. Rather, the specific features and methods are disclosed as example implementations of adaptive low-light view modes.

The invention claimed is:

1. A method comprising:
   determining, by a first electronic device using a global positioning system, an approximate location of a second electronic device associated with the first electronic device;
   transmitting, by the first electronic device via a wireless interface, and to a repository of imagery, the approximate location of the second electronic device;
   receiving, by the first electronic device via the wireless interface, and from the repository, imagery associated with the approximate location of the second electronic device;
   receiving, by the first electronic device and from the second electronic device, infrared imagery that corresponds to the imagery received from the repository;
   merging, by the first electronic device, the imagery received from the repository and the infrared imagery received from the second electronic device; and
   transmitting, by the first electronic device and to the second electronic device, the merged imagery effective to cause the second electronic device to present the merged imagery.

2. The method of claim 1, wherein merging the imagery received from the repository and the infrared imagery received from the second electronic device comprises colorizing, based on the imagery received from the repository, elements of the infrared imagery received from the second electronic device.

3. The method of claim 1, further comprising:
   determining, by the first electronic device using an accelerometer or a magnetometer, an orientation of the second electronic device; and
   transmitting, by the first electronic device, an indication of the orientation of the second electronic device to the repository.

4. The method of claim 1, wherein merging the imagery received from the repository and the infrared imagery received from the second electronic device further comprises:
   prioritizing a first set of elements in the imagery received from the repository;
   prioritizing a second set of elements in infrared imagery received from the second electronic device; and
   merging at least some of the first set of elements and at least some of the second set of elements based on the respective priorities of each element.

5. The method of claim 4, wherein the first set of elements include permanent objects, physical structures, or landmarks.

6. The method of claim 4, wherein the second set of elements include non-permanent type objects or objects captured in real-time.

7. The method of claim 1, wherein the second electronic device comprises one of a smart phone, tablet computer, wearable computer, or vehicle-based display.

8. A first electronic device, comprising:
   a global positioning system configured to determine a location of the first electronic device;
   a wireless interface configured to enable communication of data via a wireless network;
   one or more processors; and
   at least one non-transitory computer-readable storage medium storing instructions that are executable by the one or more processors to:
     determine, using the global positioning system, an approximate location of a second electronic device;
     transmit, via the wireless interface and to a repository of imagery, the approximate location of the second electronic device;
     receive, via the wireless interface and from the repository, imagery associated with the approximate location of the second electronic device;
     receive, from the second electronic device, infrared imagery that corresponds to the imagery received from the repository;
     merge the imagery received from the repository and the infrared imagery received from the second electronic device; and
     transmit, to the second electronic device, the merged imagery effective to cause the second electronic device to present the merged imagery.

9. The first electronic device of claim 8, wherein the instructions stored on the at least one non-transitory computer-readable storage medium that cause the one or more processors to merge the imagery received from the repository and the infrared imagery received from the second electronic device further cause the one or more processors to colorize, based on the imagery received from the repository, elements of the infrared imagery received from the second electronic device.

10. The first electronic device of claim 8, wherein the instructions stored on the at least one non-transitory computer-readable storage medium further cause the one or more processors to:
    determine, using an accelerometer or a magnetometer, an orientation of the second electronic device; and
    transmit an indication of the orientation of the second electronic device to the repository.

11. The first electronic device of claim 8, wherein the instructions stored on the at least one non-transitory computer-readable storage medium that cause the one or more processors to merge the imagery received from the repository and the infrared imagery received from the second electronic device further cause the one or more processors to:
- prioritize a first set of elements in the imagery received from the repository;
- prioritize a second set of elements in infrared imagery received from the second electronic device; and
- merge at least some of the first set of elements and at least some of the second set of elements based on the respective priorities of each element.

12. The first electronic device of claim 11, wherein the first set of elements include permanent objects, physical structures, or landmarks.

13. The first electronic device of claim 11, wherein the second set of elements include non-permanent type objects or objects captured in real-time.

14. The first electronic device of claim 8, wherein the second electronic device comprises one of a smart phone, tablet computer, wearable computer, or vehicle-based display.

15. The first electronic device of claim 8, wherein the first electronic device is configured in whole, or in part, as one of a smart phone, tablet computer, wearable computer, or vehicle-based navigation device.

* * * * *